United States Patent [19]

Sons, Jr.

[11] 4,075,054
[45] Feb. 21, 1978

[54] APPARATUS FOR FORMING BEADED RADIAL PLY TIRE

[75] Inventor: Charles C. Sons, Jr., Peoria, Ill.

[73] Assignee: Caterpillar Tractor Co., Peoria, Ill.

[21] Appl. No.: 735,924

[22] Filed: Oct. 27, 1976

[51] Int. Cl.² ............................................. B29H 17/06
[52] U.S. Cl. ................................. 156/414; 156/123 R; 156/132; 156/400
[58] Field of Search ................... 156/110 R, 117, 121, 156/123, 131–133, 135, 173, 394, 397, 398–403, 407, 414, 415, 417, 425, 446, 457, 422; 152/330 R, 362 R, 354–356; 242/68.5, 72; 279/2

[56] References Cited

U.S. PATENT DOCUMENTS

| | | | |
|---|---|---|---|
| 1,061,722 | 5/1913 | Bell | 156/398 |
| 1,248,871 | 12/1917 | Kremer | 156/397 |
| 1,316,104 | 9/1919 | Nall | 156/117 |
| 1,627,212 | 5/1927 | Stewart | 156/397 |
| 3,016,084 | 1/1962 | Niclas et al. | 156/123 |
| 3,178,327 | 4/1965 | Beckadolph et al. | 156/133 |
| 3,431,963 | 3/1969 | Sons | 152/356 |
| 3,682,576 | 8/1972 | Gross | 425/46 |
| 3,864,188 | 2/1975 | Grawey et al. | 156/117 |

FOREIGN PATENT DOCUMENTS 672,455  12/1965  Belgium ........................ 156/414

Primary Examiner—William A. Powell
Assistant Examiner—John E. Kittle
Attorney, Agent, or Firm—Phillips, Moore, Weissenberger, Lempio & Majestic

[57] ABSTRACT

A core, which can be disassembled, for forming a beaded radial ply tire including arcuate beams forming a circular support ring, mold pieces removably supported on the ring and forming an inner mold for the tire tread, side panels removably secured to the mold pieces and forming an inner mold for each of the tire side walls, and bead formers pivotally connected to and extending from the side panels to receive, in one position, bead wedge portions and pivoting to another position so that the ends of plies can be doubled back over the bead wedge portions and the ends of a tire liner can then be folded over the ends of the plies. The core can be disassembled after the tire is cured by first removing the ring. Thereafter, the side panels can be disassembled by moving towards the core center a side panel which is a key panel followed by disassembly of the remaining side panels. The mold pieces are disassembled by moving towards the core center a piece which is a key piece followed by disassembly of the remaining mold pieces.

7 Claims, 6 Drawing Figures

FIG_2

FIG_3

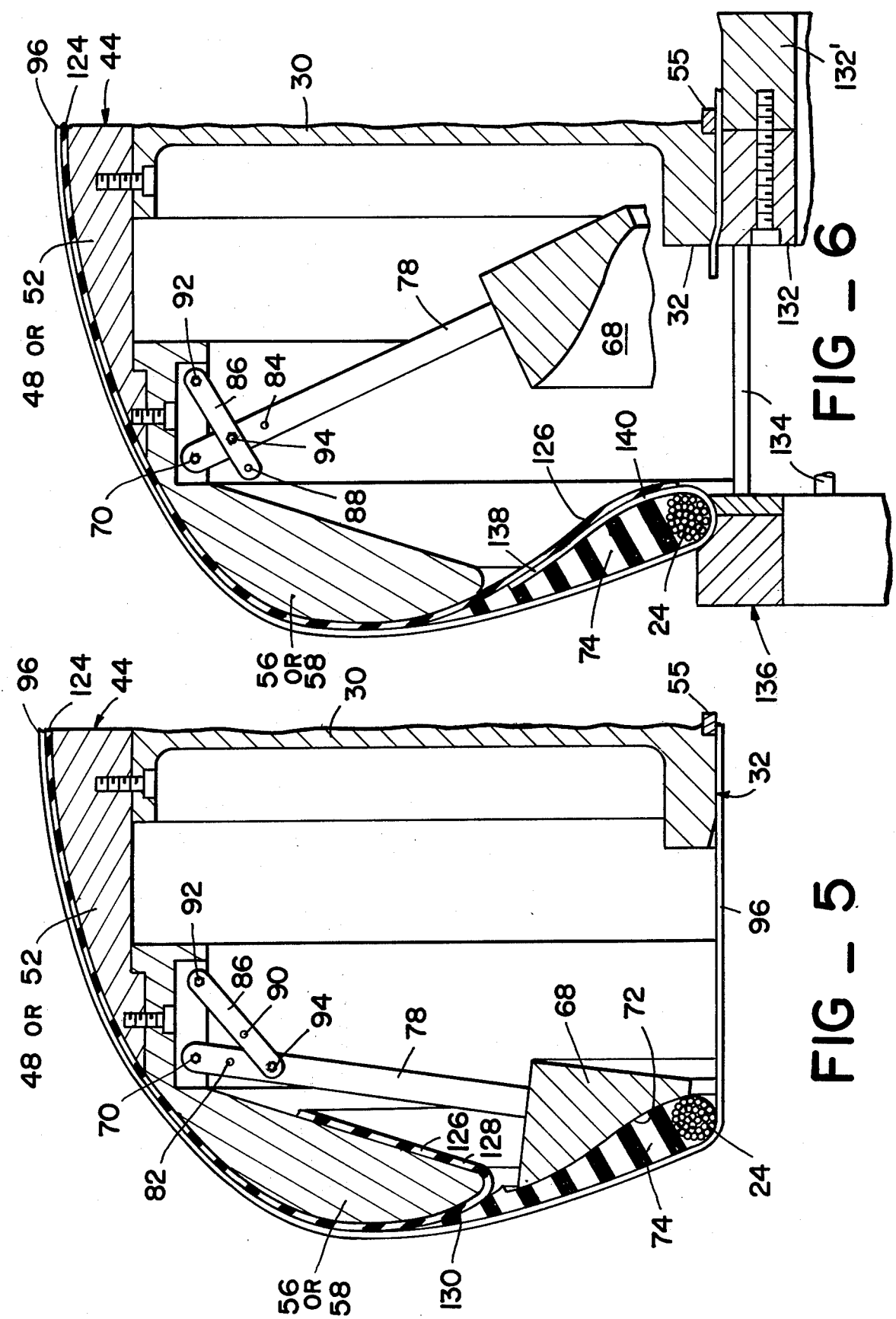

APPARATUS FOR FORMING BEADED RADIAL PLY TIRE

BACKGROUND OF THE INVENTION

1. Field of the Invention

The invention is concerned with the art of forming a beaded radial ply tire and more particularly is concerned with an improved apparatus for forming such a tire wherein the radial plies of the tire extend about the bead regions of the tire and have end portions which are doubled back at the beads and terminated at inner portions of the sidewalls.

2. Prior Art

The prior art and in particular U.S. Pat. No. 3,431,963 discloses beaded radial ply tires, the plies of which extend about the bead regions of the tire and have end portions which are doubled back at the beads and terminated at inner portions of the side walls. A number of advantages of such tires are set out in the aforementioned patent. The prior art, as taught for example in U.S. Pat. No. 1,248,871, discloses means for wrapping plies radially about a tire core. In such an apparatus the tire must be formed in the shape of a donut about the core and in order to remove the core from the tire, the tire must be cut between the beads thereof and then be stripped off the core. The plies of such a tire are therefore not doubled back at their end about the beads and terminated at inner portions of the side walls thus providing added sidewall strength and other advantages as mentioned in U.S. Pat. No. 3,431,963 to the tire.

In present day application tires are expected to carry heavy loads and to operate at relatively high speeds and in relatively high shock conditions as may occur on poorly kept up roads and under off-highway conditions. Thus, strengthening of the sidewall portion of the tire is quite important. Also, it is highly desirable to provide in a single operation a usable beaded radial ply tire wherein the apparatus for forming such a tire can be quickly and easily removed for reuse in the formation of other tires thus increasing tire production rates. It is also desirable to form radial plies by wrapping wire directly around a tire thus insuring uniformity of the resulting ply and eliminating the chance for ply damage prior to installation of a complete radial ply about a tire. The present invention is particularly concerned with an apparatus for accomplishing the above set out desirable objectives.

SUMMARY OF THE INVENTION

Briefly, the invention comprises an apparatus for forming a beaded radial ply tire the radial plies of which extend about the bead regions of the tire and having end portions which are doubled back at the beads and terminated at inner portions of the side walls. The apparatus comprises a plurality of arcuate beams positioned together edge to edge to form a circular ring. Also part of the tire core are a plurality of inner tread region mold pieces positioned together edge to edge to form an inner mold for an annular tread region of the tire, an edge of a key one of said pieces being angled to fit against a matchingly angled edge of an abutting piece so that said key piece is removable towards said central axis in the absence of support for said key pieces. Means are provided for removably supportingly securing said pieces to said beams. Also provided are a pair of pluralities of side panels, the panels of each of said pair of pluralities being positioned together edge to edge to form an inner mold face for a side wall of the tire, a key one of the panels of each of said pair of pluralities being angled to fit against a matchingly angled edge of an abutting panel so that said key panel is removable generally towards said central axis in the absence of support for said key panels. Each of said panels includes a bead former pivotally attached thereto fastenable in a first position to form an inner mold for a bead wedge portion of said tire and in a second position removed from said bead wedge portion of said tire. Means are provided for removably supportingly securing said panels to said pieces. The apparatus further includes a band for wedging said plies against said plurality of arcuate beams.

BRIEF DESCRIPTION OF THE DRAWINGS

The invention will be better understood by reference to the specification and drawings in the figures of which like numbers denote like parts throughout;

FIG. 5 illustrates in partial sectional view one stage in the tire-forming operation; and, FIG. 6 illustrates in partial sectional view another stage in the tire-forming operation.

DETAILED DESCRIPTION OF THE PREFERRED EMBODIMENT

Figure 1:
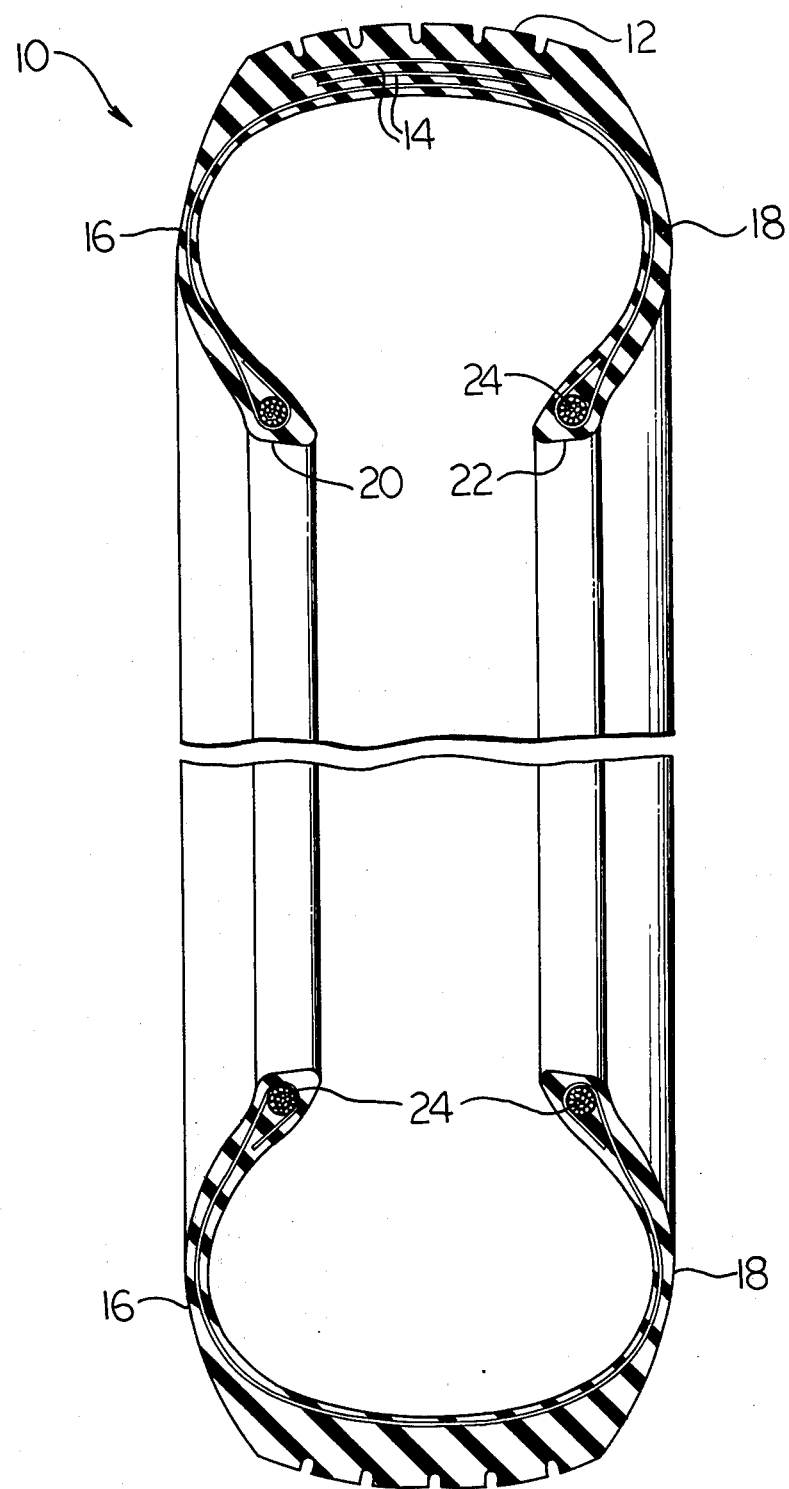
FIG. 1 illustrates, in cross sectional view, a single radial ply pneumatic tire produced in accordance with the present invention.

Referring now the drawings and more particularly to FIG. 1 thereof, a tire 10 is illustrated which may have a conventional configuration insofar as external characteristics are concerned and which thus includes an annular tread region 12 having circumferential plies 14 and a pair of side walls 16 and 18 extending to a pair of annular bead regions 20 and 22 respectively, the tread region 12 and the sidewalls 16 and 18 having a slight outward bow when the tire is unstressed. Tread region 12, sidewalls 16 and 18 and bead regions 20 and 22 are formed of a resilient elastomeric material such as rubber, as an integral unit. Bead wires, which in the instance of the present invention are a plurality of cables 24, are embedded within the bead regions 20 and 22 to provide reinforcement therein.

Figure 2:
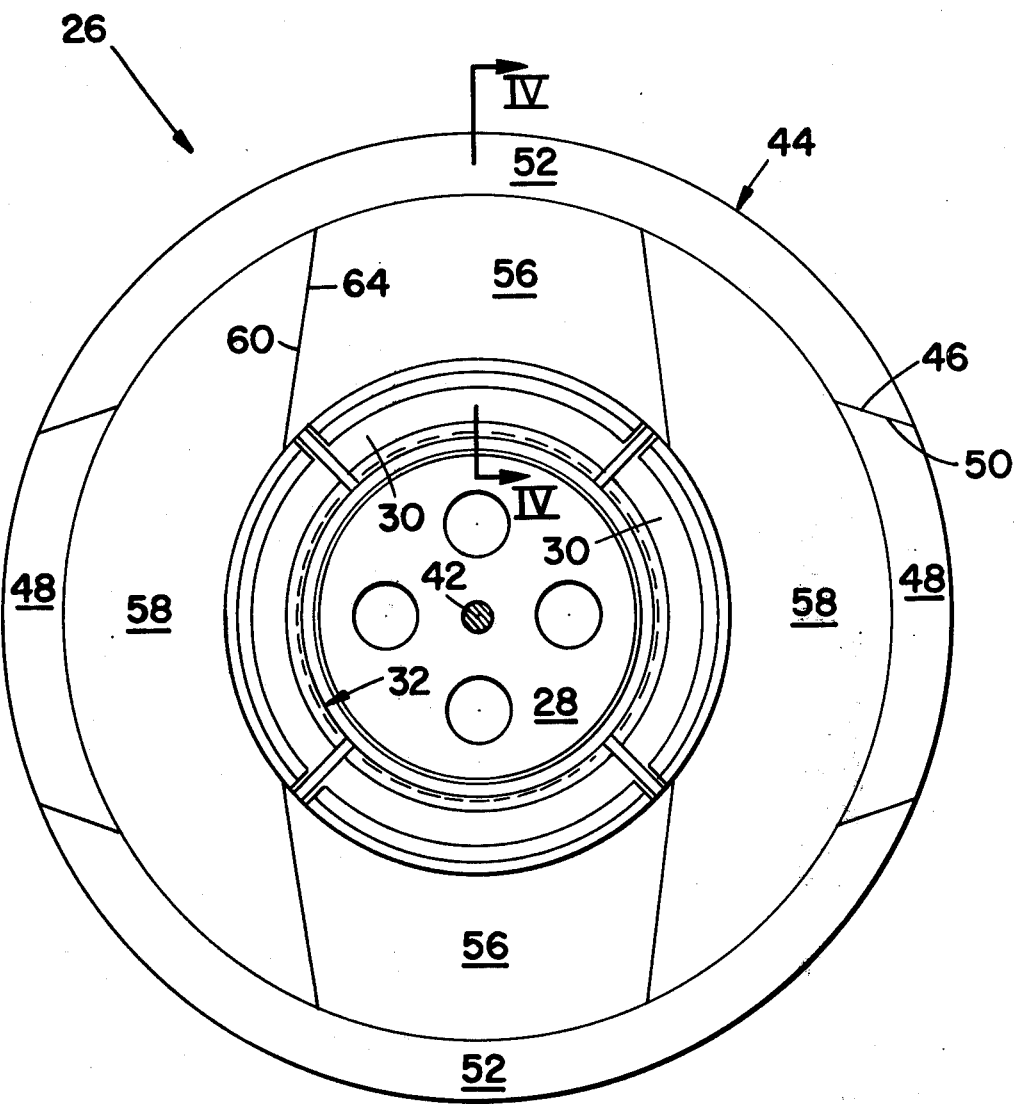
FIG. 2 illustrates in side elevation the removable core of the present invention.

The present invention is particularly concerned with a novel apparatus for forming a tire such as the tire 10. Referring to FIG. 2, there is illustrated a disassemblable and removable tire core 26 which includes a generally circular member 28 supporting a plurality of arcuate beams 30 positioned together edge to edge to form a circular ring 32. The beams 30 are removable towards a central axis 42 defined by the ring 32, in the absence of support for said beams 30. Said support can be supplied by the circular member 28 during formation of the core 26 and can be supplied by bolts and the like thereafter as discussed below.

Figure 3:
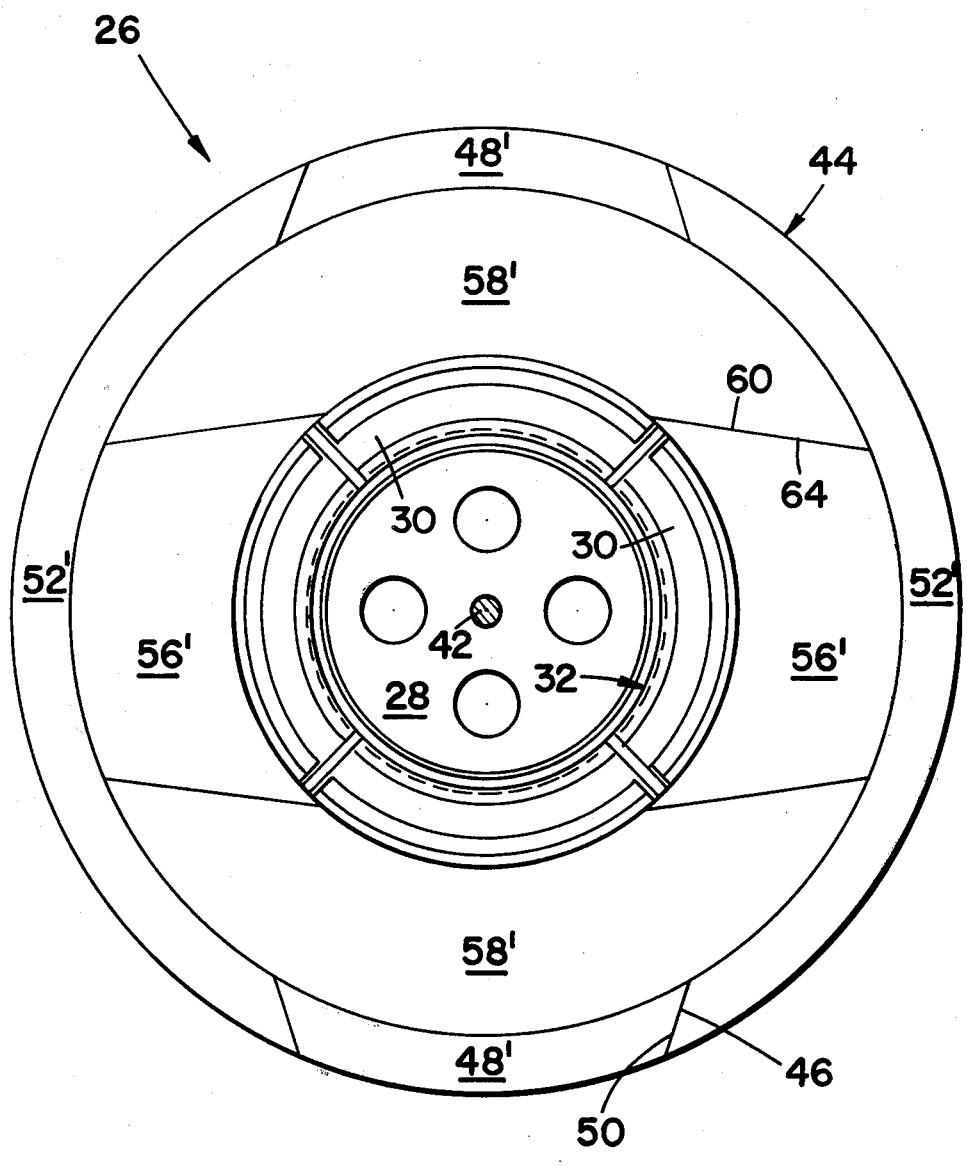
FIG. 3 illustrates a side elevation as in FIG. 2 but taken from an opposite side of the core.

A plurality of inner tread region mold pieces 44 are positioned together edge to edge to form an inner mold for the annular tread region 12 of the tire 10 in the uncured stage. An edge 46 of a key piece 48 of the mold pieces 44 is angled to fit against a matchingly angled edge 50 of an abutting piece 52 of the mold pieces 44. In the embodiment illustrated there are a pair of abutting pieces 52 and a pair of matching key pieces 48 on either side of a vertical plane parallel to the plane of FIG. 2 bisecting the core assembly 26. The pieces 48 and 52, shown in FIG. 2, are rotated 90° with respect to like pieces on the reverse side of the bisecting plane as shown in FIG. 3 and are designated 48' and 52' to distinguish them. The key pieces 48 are removable towards the central axis 42 in the absence of support of said key pieces 48 as for example by said circular ring 32. In the embodiment illustrated and as will be most apparent from the examination of FIG. 4, the key piece 48' is supported by means for removably supportingly securing the key piece 48' and for that matter the entire plurality of pieces 44 to the arcuate beams 30, said means comprising bolt means, of more particularly the bolts 54. The bolts 54 also serve along with a snap ring 55 to hold the beams 30 in the form of the circular ring 32. The key piece 48' is generally positioned to be removably secured via the bolts 54 to more than one of the beams 30 for added structural integrity.

A pair of pluralities of side panels, one of which is indicated generally by the numerals 56, 56' and the other of which is indicated generally by the numerals 58, 58' also form a part of the removable tire core 26. The panels of each of the pair pluralities of side panels 56, 56' and 58, 58' are positioned together edge-to-edge to form an inner mold face for the sidewalls 16 and 18 of the tire 10. An edge 60 of a key panel 56 of each of the pair of pluralities of side panels 56 and 58 is angled to fit against a matchingly angled edge 64 of an abutting panel 58. In the embodiment illustrated in FIG. 2, it is clear that there are a pair of abutting panels 58 each of which has a pair of angled edges 64 which fit matchingly against the edges 60 of a pair of key panels 56. Panels 56' and 58' are rotated 90° with respect to like panels on the reverse side of the vertical plane bisecting assembly 26 as seen in FIG. 3. As will be noted, the key panels 56 are removable generally towards the central axis 42 in the absence of support of said key panels 56.

Figure 4:
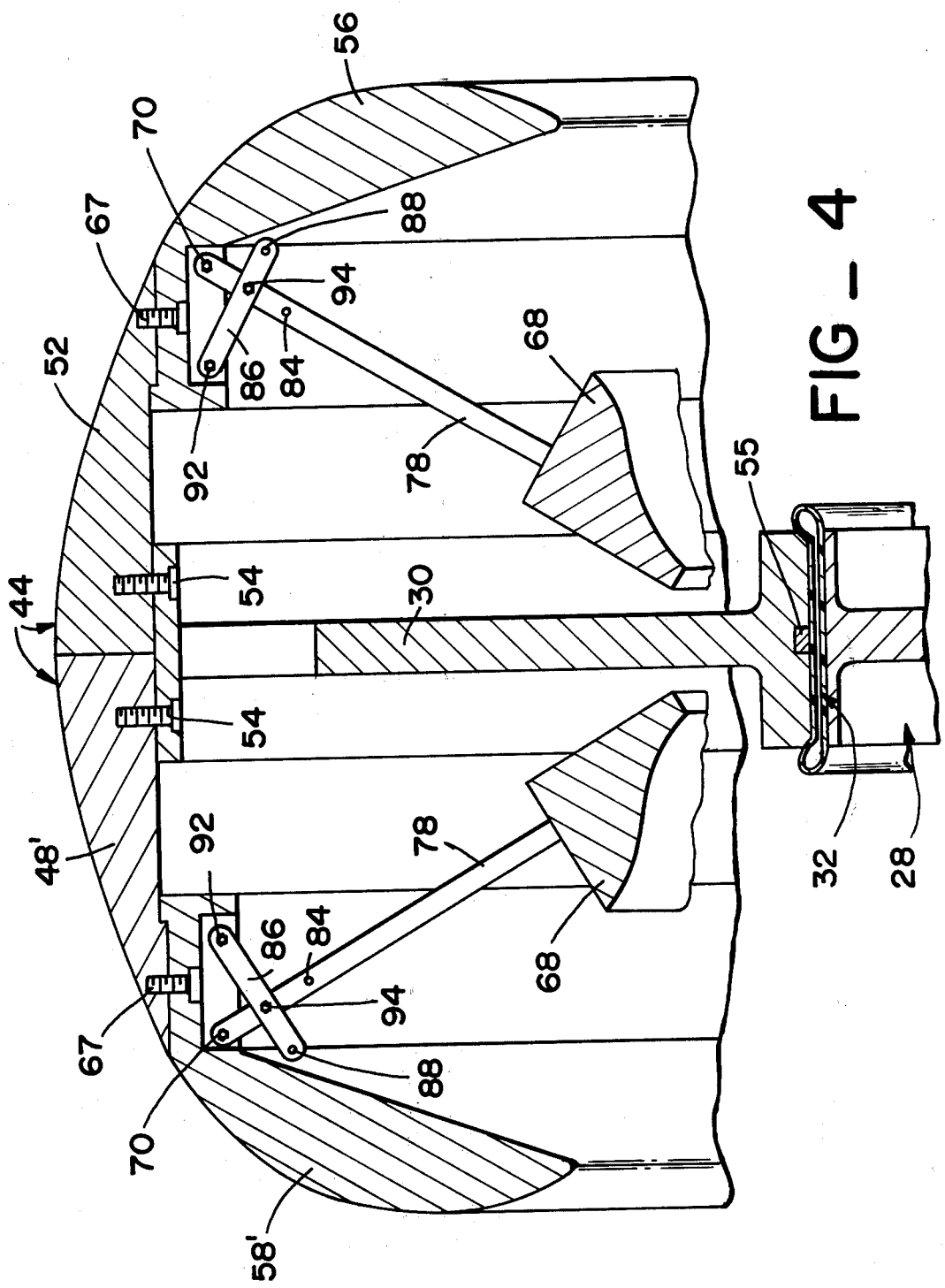
FIG. 4 illustrates a view taken from the plane IV—IV of FIG. 2.

Adverting primarily to FIG. 4, the first plurality of side panels 56 and the second plurality of side panels 58 are each removably supportingly secured to the plurality of inner tread region mold pieces 44 via bolts means, in the embodiment illustrated, via the bolts 67. Generally, to provide added structural integrity to the core 26, the key panel or panels 56 are positioned to be removably secured to more than one of the pieces 44.

Referring now most particularly to FIGS. 4, 5 and 6 it will be clear that each of the panels of each of the pairs 56 and 58 of pluralities of side panels includes a bead former 68 pivotally attached thereto as at an axis 70 and fastenable in a first position as illustrated in FIG. 5 to form an inner mold 72 for a bead wedge portion 74 of the tire 10. Each of the bead formers 68 are pivotally attached to the pluralities of side panels 56 and 58 via a lever 78 which is rotatably attached at the axis 70 to each one of the side panels 56 or 58. The lever 78 includes, in the embodiment illustrated a first hole 82 and a second hole 84 therethrough sequentially further removed from the axis 70 thereof. Also pivotally attached to the respective one of the side panels 56 and 58 is a bar 86 which includes a first hole 88 therein and a second hole 90 therein intermediate said first hole 88 and a point 92 of pivotal attachment of the bar 86 to the respective one of the pluralities of side panels 56 and 58. Nut and bolt means 94 or their operational equivalent serve for fastening the first hole 88 of the bar 86 to the second hole 84 of the lever 78 whereby the inner mold 72 is formed as illustrated in FIG. 5. The nut and bolt means 94 can also be used as illustrated in FIG. 6 to fasten the second hole 90 in the bar 86 to the first hole 82 in the lever 78, whereby the bead former 68 is held in the position illustrated in FIG. 6.

OPERATION

A tire core 26 is first assembled by fastening the plurality of inner tread region mold pieces 44 to the arcuate beams 30 using the bolts 54 and generally using the circular member 28 as a temporary support during assembly and for added stability during handling and fabrication. Then, the first plurality of side panels 56 and the second plurality of side panels 58 are fastened to the plurality of inner tread region mold pieces 44 using the bolts 67. The bead formers 68 are positioned as shown in FIGS. 4 and 6 through fastening the nut and bolt means 94 into the first hole 82 in the lever 78 and the second hole 90 in the bar 86. Referring particularly to FIGS. 5 and 6, a liner 124 of an uncured elastomer such as rubber is wrapped about the first and second pluralities of side panels 56 and 58 and over the plurality of inner tread region mold pieces 44 and is folded up against the inside of the first and second plurality of side panels 56 and 58 at an end region 126 of said liner 124. Generally, because of the usually sticky characteristics of the liner 124, (which may be coated with chemicals which aid in later curing of the tire) the end region 126 thereof will stick against an infacing portion 128 of each of the pluralities of side members 56 and 58. The bead former 68 is then rotated so that it forms an inner mold 72 for the bead wedge portion 74 of the tire 10. To accomplish this, the nut and bolt means 94 is fastened through the second hole 84 of the lever 78 and through the first hole 88 of the bar 86. Then, the bead wedge portion 74, which is also formed of uncured rubber, is placed against and adheres to, due to the previously mentioned sticky characteristics thereof, an exterior surface 130 of the linear 124.

The tire 10 with the tire core 26 therein, the circular member 28 removed therefrom and the bead former 68 positioned as shown in FIG. 5 is then transferred and radial ply 96 is wound about the tire 10 as by the apparatus and process set out in U.S. Pat. No. 3,864,188.

Referring once again to FIGS. 5 and 6, it will be seen that FIG. 5 illustrates the tire immediately after the radial ply 96 has been placed thereabout. A circular wedge band 132 is then placed in contact with the radial ply 96 as shown in FIG. 6 thereby forcing the radial ply 96 tightly up against the inner circumference of the circular ring 32. The wedge band 132 is held in place by a plurality of tie rods 134 which also connect a bead support ring 136 adapted to hold the bead wedge portion 74 of the tire 10 in position. With the radial ply 96 pinched between the circular ring 32 and the wedge band 132, 132', generally bolted together as shown in FIG. 6, the radial ply 96 is cut adjacent the wedge band 132 and bead former 68 is rotated out of the way as illustrated in FIG. 6. An end portion 138 of the radial ply 96 is then folded back against an interior surface 140 of the bead wedge portion 74. Then, the end region 126 of the liner 124 is folded downwardly over and up against the end portion 138 of the radial ply 96. The bead former 68 is then rotated outwardly against the end region 126 of the liner 124 to maintain bead shape during following build up and cure steps. Additional layers of uncured rubber and if desired circumferential plies 14 are then applied over the radial plies 96 on the exterior surface of the tire 10.

The resulting uncured tire is then cured and vulcanized in a normal manner with the core 26 still in place. U.S. Pat. No. 3,682,576 discloses details of a common segmented mold in which a tire can be cured.

After the tire has been cured, the snap ring 55 and bolts 54 are removed. As soon as the bolts 54 are removed, the beams 30 can be removed. Next, the bolts 67 are removed and the first plurality of side panels 56 and the second plurality of side panels 58 are removed by first removing the key panels 56. Similarly, the key piece 48 is removed followed by the rest of the plurality of inner tread region mold pieces 44. The resulting cured tire is illustrated in FIG. 1.

While the present invention has been described with respect to a specific embodiment, it is to be understood that changes and modifications may be made therein without departing from the spirit and scope of the present invention as defined in the appended claims.

What is claimed is:

1. A disassemblable core for forming a beaded radial ply tire having an annular tread region, and plies which extend about bead regions of the tire and include first end portions that are doubled back at the bead regions and terminate at inner portions of side walls of the tire, comprising:
   a. a plurality of arcuate beams positioned together edge-to-edge to form a circular support ring having a central axis;
   b. a plurality of mold pieces supported on said circular support ring and positioned together edge-to-edge to form an inner mold for the annular tread region of the tire, one of said mold pieces being a key piece and another of said mold pieces being adjacent said one mold piece; said one mold piece having an edge angled to match an edge of said other mold piece so that said one mold piece is removable towards said central axis in the absence of said support ring;
   c. first means for releasably securing said mold pieces to said arcuate beams;
   d. a first plurality and a second plurality of pairs of side panels, said side panels of, respectively, said first plurality and said second plurality of pairs being positioned together edge-to-edge to form an inner mold face for one of the side walls of the tire, said side panels of one of said pairs being adjacent said side panels of another of said pairs, one side panel of said one pair being a key panel and having an edge angled to match an edge of one side panel of said other pair so that said one side panel of said one pair is removable generally toward said central axis in the absence of said support ring, said side panels being shaped to receive folded back second end portions of a tire line during formation of the tire;
   e. second means for releasably securing said first and said second plurality of side panels to said mold pieces; and
   f. a plurality of means, each pivotally attached to one of said side panels, for providing the bead regions with the plies, said bead region providing means having means extending from said side panels and pivotable to a first position to form a mold for receiving bead wedge portions and pivotable away from the bead wedge portions to a second position so that said first end portions of said plies can be doubled back over the bead wedge portions and said second end portions of the liner can be folded over the first end portions of the plies.

2. A core as in claim 1 wherein said key side panel is attached to more than one of said mold pieces.

3. A core as in claim 1, wherein said key piece is attached to more than one of said arcuate beams.

4. A core as in claim 2, further including means for wedging the plies against said plurality of arcuate beams.

5. A core as in claim 1, wherein each of said means for providing plies comprises an inner mold surface portion and a lever means pivotally attached at one end to a respective one of said side panels and connected at the other end to said mold surface portion.

6. A core as in claim 4, wherein said first securing means comprises bolt means and said second securing means comprises bolt means.

7. A core as in claim 1, wherein a respective one pair of of said side panels of said first plurality is rotated 90° relative to a respective similar one pair of said second plurality.

* * * * *